(No Model.)
S. TOWNSEND.
CYLINDER LUBRICATOR.
No. 313,033. Patented Feb. 24, 1885.
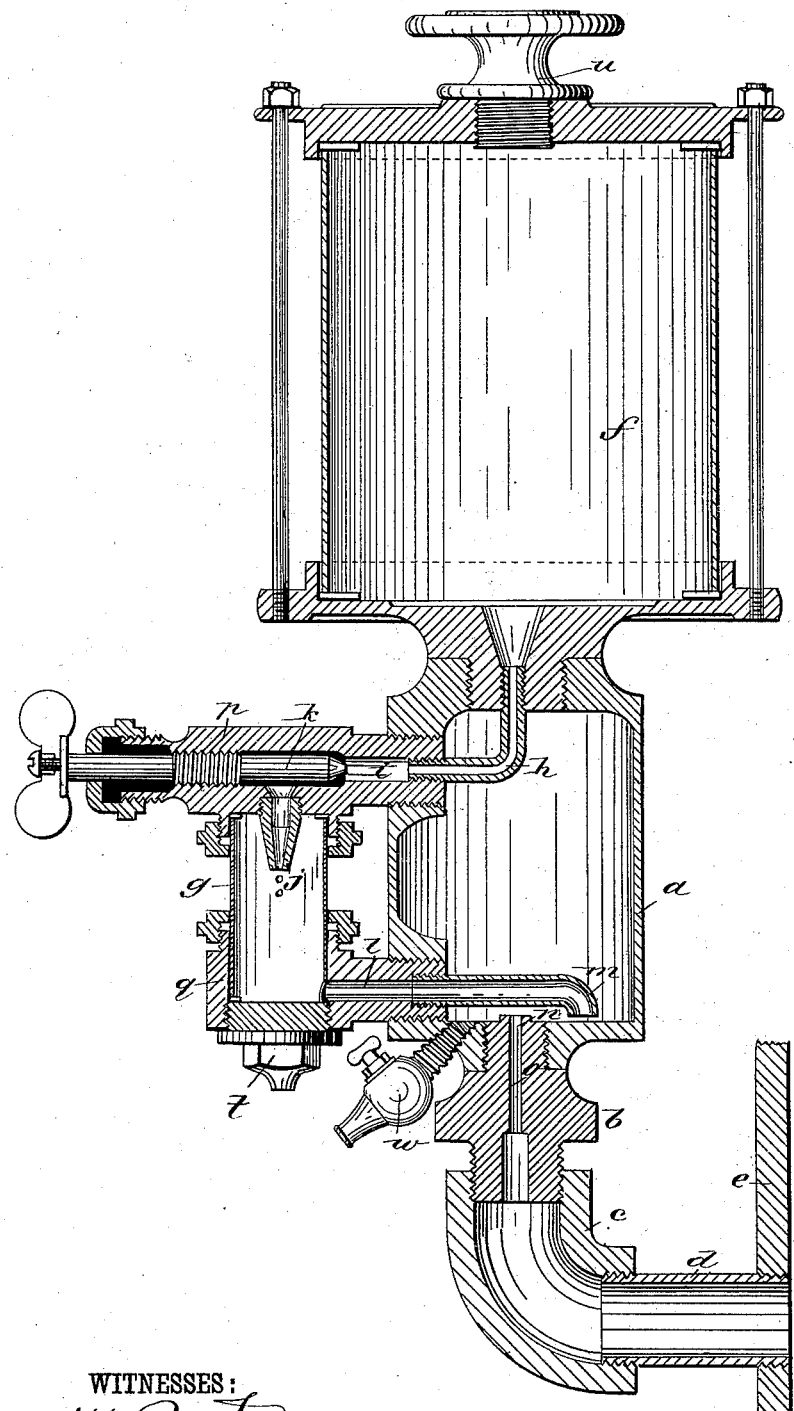
WITNESSES:
Otto Beyer
C. Sedgwick
INVENTOR:
S. Townsend
BY Munn & Co
ATTORNEYS.

UNITED STATES PATENT OFFICE.

SAMUEL TOWNSEND, OF DETROIT, MICHIGAN.

CYLINDER-LUBRICATOR.

SPECIFICATION forming part of Letters Patent No. 313,033, dated February 24, 1885.

Application filed November 20, 1882. Renewed August 28, 1884. (No model.)

*To all whom it may concern:*

Be it known that I, SAMUEL TOWNSEND, of Detroit, in the county of Wayne and State of Michigan, have invented a new and Improved Cylinder-Lubricator, of which the following is a full, clear, and exact description.

My invention consists of improvements in the contrivance of the oil-cup, sight-feed tube, and condenser, whereby I provide an automatic drop-sight feed in which the oil drops through an empty glass tube, which is better than to float up through the water, and my arrangement is much simpler and cheaper than other lubricators of like character, enabling me to employ a glass oil-cup, in consequence of its protection from breakage by the effects of steam, and the contrivance being such that only one valve is required for the regulation of it, all as hereinafter fully described.

Reference is to be had to the accompanying drawing, forming part of this specification, which is a sectional elevation of my improved lubricator.

In the first place, I provide a brass or other metal condensing-chamber, $a$, which I attach by suitable connections, $b\ c\ d$, to the steam-pipe $e$, or other part from which the steam is to be taken, and into which the oil is to be supplied for passing into the cylinder to lubricate the valves, piston, and other parts. Next I attach the glass oil-cup $f$ to the top of the condenser by any suitable means, and then I apply the drop-sight glass feeding-tube $g$ to the side of the condenser and make connection between the top of the glass tube with the bottom of the oil-cup by the pipe $h$, passage $i$, and the nipple $j$, with a regulating-valve, $k$, in the said passage $i$, and I connect the bottom of the glass tube with the lower portion of the condenser by the passage $l$ and siphon-pipe $m$, said pipe $m$ discharging on a level with a nipple, $n$, through which the steam-passage $o$ enters the condenser slightly above the surface of the bottom, and being bent a little so as to be at one side of the nipple $n$. It will be seen that a fine jet of steam will enter condenser $a$, passing upward therein, condensing and falling to the bottom, thus losing its force and promoting the passage of steam into the feed-tube, but will allow the oil to escape from said tube into the condenser, from which it will flow into passage $o$ along with any excess of water, and thence will pass into the steam-pipe. The cup $f$ then being filled with oil and the valve $k$ opened, the oil will drop from the nipple $j$ through feed-tube $g$, where the falling drops may be seen to the best advantage for a guide by which to set the valve for regulating the feed.

Steam may be let into the tube $g$ and the glass cup for cleaning them out, if desired, by drawing off the water from the bottom of the condenser through the waste-cock $w$.

It will be seen that the oil-cup $f$ is so well protected from the steam that glass may be used for the cylinder of the cup with safety, which is very desirable in order that the attendant may always see when it requires to be replenished.

The fittings $p$ and $q$, by which the glass tube is connected to the condenser, may be of the ordinary contrivance, except that I make a hole through fitting $q$ large enough to put in and take out the tube $g$ through it when required, and close it with a plug, $t$.

A removable plug, $u$, is fitted in the top of the oil-cup to stop the filling-hole in the usual manner.

Having thus described my invention, what I claim as new, and desire to secure by Letters Patent, is—

1. The combination, in a lubricator, of an oil-cup, $f$, drop-sight feed-tube $g$, and condenser $a$, the arrangement being such that the oil, regulated by a valve between the cup $f$ and the feed-tube $g$, drops through said tube and passes thence to the condenser, substantially as described.

2. The combination, in a lubricator, of condenser $a$, attached to the steam-pipe or other part to be lubricated, oil-cup $f$, mounted on the top of the condenser, and drop-sight feed-tube $g$, attached to the side of the condenser, substantially as described.

3. The oil-cup $f$, mounted on the top of the condenser $a$, and connected through the top of said condenser with the glass drop-sight feed-tube $g$ by the pipe $h$, passage $i$ in fitting $p$, and the nipple $j$, substantially as described.

4. The combination of nipple $n$ of steam-passage $o$, and siphon-pipe $m$ of feed-tube $g$, with the condenser $a$, the arrangement and operation being substantially as described.

5. The combination of regulating-valve $k$ with sight-feed tube $g$ and oil-cup $f$, said valve being located in passage $i$ of the fitting $p$, and regulating the flow of oil from the cup $f$ to said drop-sight feed-tube, substantially as described.

SAMUEL TOWNSEND.

Witnesses:
ROE STEPHENS,
J. G. GILCHRIST.